US008920258B2

(12) United States Patent
Dolezel et al.

(10) Patent No.: US 8,920,258 B2
(45) Date of Patent: Dec. 30, 2014

(54) GOLF CLUB HEAD

(75) Inventors: Keith F. Dolezel, Covina, CA (US); Matthew R. Daraskavich, Huntington Beach, CA (US)

(73) Assignee: Dunlop Sports Co. Ltd., Kobe-shi (JP)

( * ) Notice: Subject to any disclaimer, the term of this patent is extended or adjusted under 35 U.S.C. 154(b) by 239 days.

(21) Appl. No.: 13/567,464

(22) Filed: Aug. 6, 2012

(65) Prior Publication Data

US 2014/0038747 A1 Feb. 6, 2014

(51) Int. Cl.
*A63B 53/04* (2006.01)
*B23K 31/02* (2006.01)

(52) U.S. Cl.
USPC ........... 473/324; 473/342; 473/349; 473/350; 228/101; 29/428

(58) Field of Classification Search
USPC ............ 473/324–350, 287–292, 409; 29/428; 228/101
See application file for complete search history.

(56) References Cited

U.S. PATENT DOCUMENTS

| | | | |
|---|---|---|---|
| 5,255,918 A | | 10/1993 | Anderson et al. |
| 5,282,625 A | * | 2/1994 | Schmidt et al. ............... 473/350 |
| 5,333,871 A | | 8/1994 | Wishon |
| 5,409,229 A | * | 4/1995 | Schmidt et al. ............... 473/332 |
| 5,447,311 A | | 9/1995 | Viollaz et al. |
| 5,485,997 A | * | 1/1996 | Schmidt et al. ............... 473/251 |
| 5,509,660 A | | 4/1996 | Elmer |
| 5,547,194 A | | 8/1996 | Aizawa et al. |
| 5,588,923 A | * | 12/1996 | Schmidt et al. ............... 473/340 |
| 5,720,673 A | | 2/1998 | Anderson |
| 5,749,794 A | | 5/1998 | Kobayashi et al. |
| 6,045,456 A | | 4/2000 | Best et al. |
| 6,743,117 B2 | | 6/2004 | Gilbert |
| 6,981,924 B2 | | 1/2006 | Deshmukh |
| 7,004,853 B2 | | 2/2006 | Deshmukh |
| 7,014,571 B2 | | 3/2006 | Deshmukh |
| 7,022,031 B2 | | 4/2006 | Nishio |
| 7,066,834 B2 | | 6/2006 | Yamamoto |
| 7,112,148 B2 | | 9/2006 | Deshmukh |
| 7,121,958 B2 | | 10/2006 | Cheng et al. |
| 7,220,189 B2 | | 5/2007 | Wieland et al. |
| 7,491,136 B2 | | 2/2009 | Deng et al. |
| 7,883,431 B2 | | 2/2011 | Matsunaga et al. |
| 2003/0064824 A1 | | 4/2003 | Takeda |
| 2004/0266548 A1 | | 12/2004 | Cheng et al. |
| 2005/0239575 A1 | | 10/2005 | Chao et al. |
| 2006/0199661 A1 | | 9/2006 | Deng et al. |

* cited by examiner

*Primary Examiner* — Sebastiano Passaniti
(74) *Attorney, Agent, or Firm* — Oliff PLC

(57) ABSTRACT

A golf club head has a main body and a front recess that includes a flange. A rear portion of the main body includes a perimeter-weighting element. A striking face insert is secured within the front recess. A face center is located on the front surface of the striking face insert. A rear cavity is at least partially delimited by the perimeter-weighting element and a rear surface of the striking face insert. A rear insert is secured to the rear surface of the striking face insert. In an imaginary horizontal plane passing through a portion of the rear insert, proximate a heel portion of the club head, a heelwardmost point of the rear insert is spaced further from a vertical center plane than a minimum distance between the flange and the center plane. The club head comprises an auxiliary recess that extends outward from the rear cavity.

22 Claims, 11 Drawing Sheets

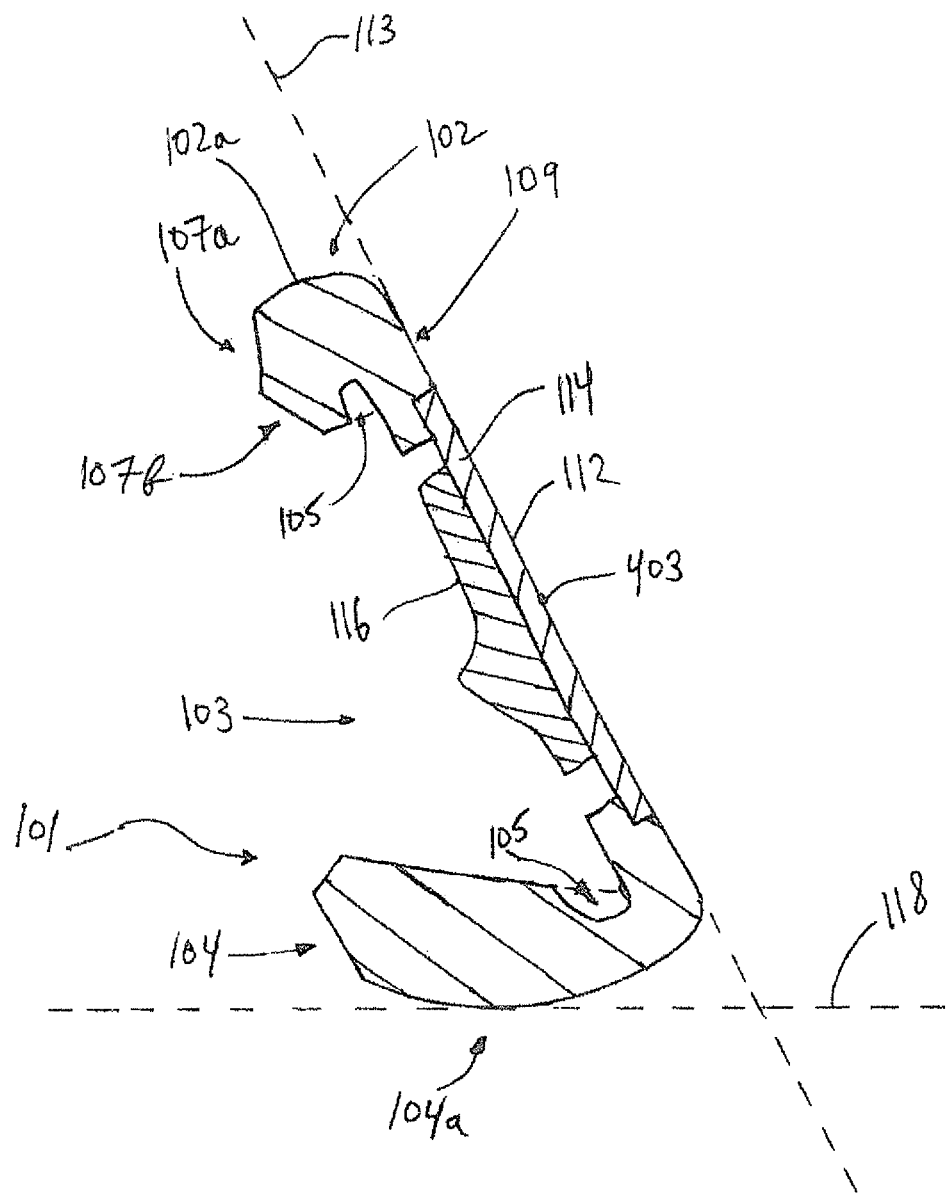

A-A'

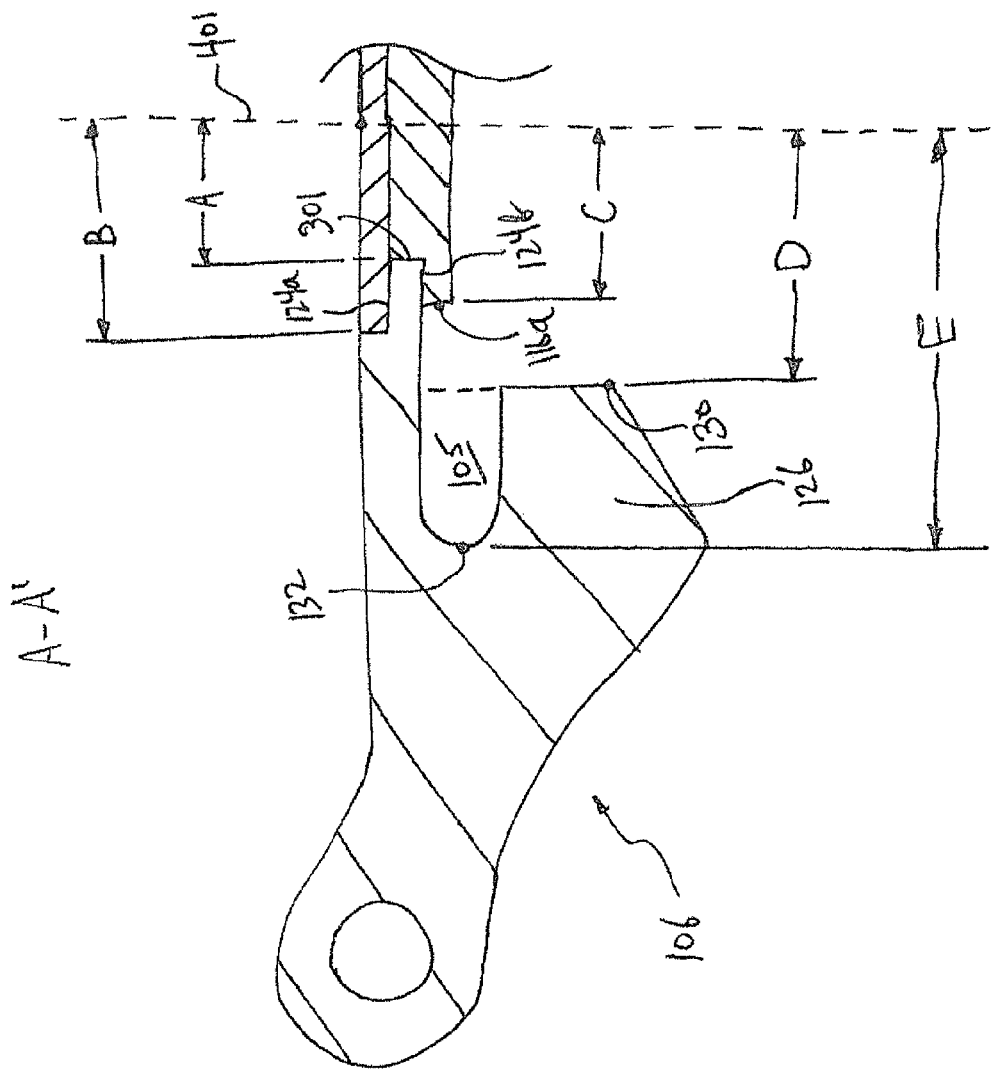

GOLF CLUB HEAD

COPYRIGHT AUTHORIZATION

The disclosure below may be subject to copyright protection. The copyright owner has no objection to the facsimile reproduction by any one of the documents containing this disclosure, as they appear in the Patent and Trademark Office records, but otherwise reserves all applicable copyrights.

BACKGROUND OF THE INVENTION

Golf club heads often include a striking face insert that is attached to a main body of a golf club head, for example. Conventional unitary golf club heads typically include rigid metal striking faces that are often associated with a harsh feel on off-center shots, or increased weight compared to some multi-component golf club heads. But, to diminish unwanted vibrations, to increase discretionary weight, and/or to generally improve a golf club's performance by including a striking face that is of a harder or softer material than that of the main body, inserts of various materials may be used as the striking face of the golf club head.

A recent trend in golf club design has golf club manufacturers moving more mass from the center of the club head outward and rearward to increase moment of inertia. In iron type golf club heads, for example, this is often accomplished by forming perimeter-weighting elements located about a main (or rear) cavity. In some cases, even more mass is preferentially relocated by configuring the main, or rear, cavity to diverge in the forward direction, or by forming additional recesses that intersect with, and extend outward from, the main, or rear, cavity, e.g. forming an undercut recess.

However, divergence of the main, or rear, cavity proximate the heel portion creates a problem for club heads that include striking face inserts. Because such inserts must be secured to the striking face in a limited region, particularly when welded, the junction between the striking face insert and the remaining club head main body often becomes visible from the rear. This not only affects the golfer's confidence in his or her equipment, but also diminishes the ability to place a rear insert on the rear of the club head. For example, if the striking face insert is attached by a welding process, it is difficult to condition (e.g. by polishing, or selectively roughening) the surface of the club head proximate the weld area from the rear of the club head because the extension of the main, or rear, cavity is partially enclosed. This lack of polishing is not only aesthetically displeasing, but also makes it difficult to attach the rear insert.

SUMMARY

Certain embodiments of the present invention, in one or more aspects thereof, advantageously comprise a golf club head that, when oriented in a reference position, includes a main body having a front portion, a rear portion, a top portion, a sole portion, a heel portion, a toe portion, and a front recess extending from the front portion toward the rear portion. The front recess includes a generally planar attachment surface, a portion of which incorporated into a flange. The rear portion includes a perimeter-weighting element. A striking face insert is secured within the front recess and has a front surface and a rear surface. The striking face insert is generally coplanar with an imaginary striking face plane. A face center is located on the front surface of the striking face insert. A rear cavity is at least partially delimited by the perimeter-weighting element and the rear surface of the striking face insert. A rear insert is secured to the rear surface of the striking face insert. An imaginary vertical center plane is perpendicular to the striking face plane and passes through the face center. In an imaginary horizontal plane passing through a portion of the rear insert, the rear insert comprises a heelwardmost point and a toewardmost point opposite the heelwardmost point. Also, in this plane, proximate the heel portion, the heelwardmost point of the rear insert is spaced further from the center plane than a centermost point of the flange. Also in this plane, the club head comprises an auxiliary recess that intersects with, and extends outward from, the rear cavity.

These and other features and advantages of the golf club head according to the invention in its various aspects, as provided by one or more of the various examples described in detail below, will become apparent after consideration of the ensuing description, the accompanying drawings, and the appended claims. The accompanying drawings are for illustrative purposes only and are not intended to limit the scope of the present invention.

BRIEF DESCRIPTION OF THE DRAWINGS

The present invention, in one or more aspects thereof, is illustrated by way of example and not by way of limitation, in the figures of the accompanying drawings, where:

FIG. 1d is a cross-sectional view of the golf club head of FIG. 1a through plane B-B', according to one example embodiment;

FIG. 3a is a partial cross-sectional view of the golf club head of FIG. 1a through cross-section A-A', according to one example embodiment;

For purposes of illustration, these figures are not necessarily drawn to scale. In all the figures, same or similar elements are designated by the same reference numerals.

DETAILED DESCRIPTION

Representative examples of one or more novel and nonobvious aspects and features of a golf club head according to the present invention, disclosed below, are not intended to be limiting in any manner. Furthermore, the various aspects and features of the present invention may be used alone or in a variety of novel and nonobvious combinations and subcombinations with one another.

As mentioned, as perimeter-weighting iron club heads having recesses that intersect, and extend outward from, main cavities (e.g. undercut recesses) have become more popular, club manufacturers are trying to move more mass from the center of the club head outward and rearward to increase moment of inertia and, thus, forgiveness of club heads on off-centered shots. Undercut recesses may be formed not only proximate the sole portion, but proximate the heel and toe portions of the golf club head, and in some cases, proximate the top portion of the golf club head. In other words, a "360° undercut recess" is possible.

However, an undercut recess proximate the heel portion creates a problem for club heads having striking face inserts. The area at which the striking face insert and the remaining club head main body is attached often becomes visible when viewed from the rear. This not only affects the golfer's confidence in his or her equipment, but also limits placement of a rear insert, vibration absorption plaque or the like on the rear of the club head. For example, if the striking face insert is attached by a welding process, it is difficult to condition (e.g. by polishing and/or roughening) the weld area because the rear cavity recess is partially enclosed. This lack of conditioning is not only aesthetically displeasing, but also makes it difficult to attach the rear insert.

In one or more embodiments, and as depicted by way of example in FIGS. 1a-1d, a golf club head 100 is an iron-type golf club head. It is noted, however, that while the golf club head 100 is illustrated as an iron-type golf club head, the golf club head 100 may be any of, e.g., an iron-type, putter-type, wood-type, hybrid-type, etc. It is further noted that while the golf club head 100 is illustrated as being a right-handed golf club head, any reference to any position on the golf club head 100 may be mirrored and applied to a left-handed golf club head.

Figure 1A:
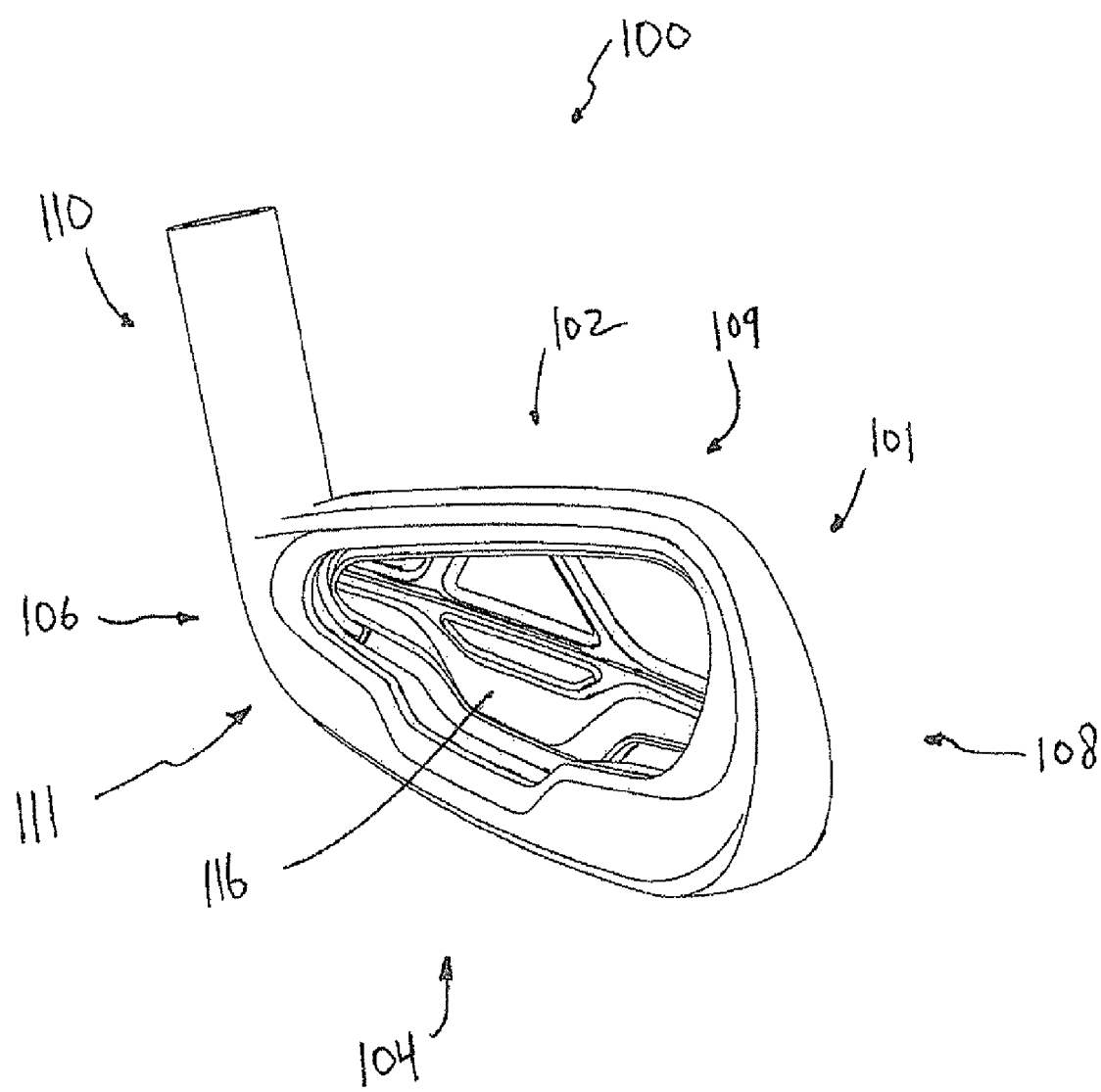
FIG. 1a is a rear perspective view of a golf club head, according to one example embodiment.

FIG. 1a illustrates a perspective view of the golf club head 100 as generally viewed from the rear. In one or more embodiments, the golf club head 100 has a top portion 102, a sole portion 104, a heel portion 106, a toe portion 108, a front portion 109 and a rear portion 111. Referring to FIGS. 1a through 1e, the golf club head 100 also has a main body 101 having a hosel 110 proximate the heel portion 106, a striking face 112, a main, or rear, cavity 103, and an auxiliary recess 105 adjacent to, and extending outward from, the main, or rear, cavity 103. The main body 101 may be comprised of any metal, polymer, ceramic, fiber-reinforced polymer, or any combination thereof. For example, the main body 101 may be comprised of stainless steel such as 431 stainless steel, 17-4 stainless steel, titanium, or a titanium alloy such as 6-4 titanium. The main body 101 may be formed by any of a casting, milling, cutting, or forging process, or any combination thereof, for example. The golf club head 100 further includes a rear insert 116 that fills at least a portion of the main, or rear, cavity 103 and is attached to one or more of the main body 101 and a rear surface of a striking face 114, as discussed below.

Figure 1B:
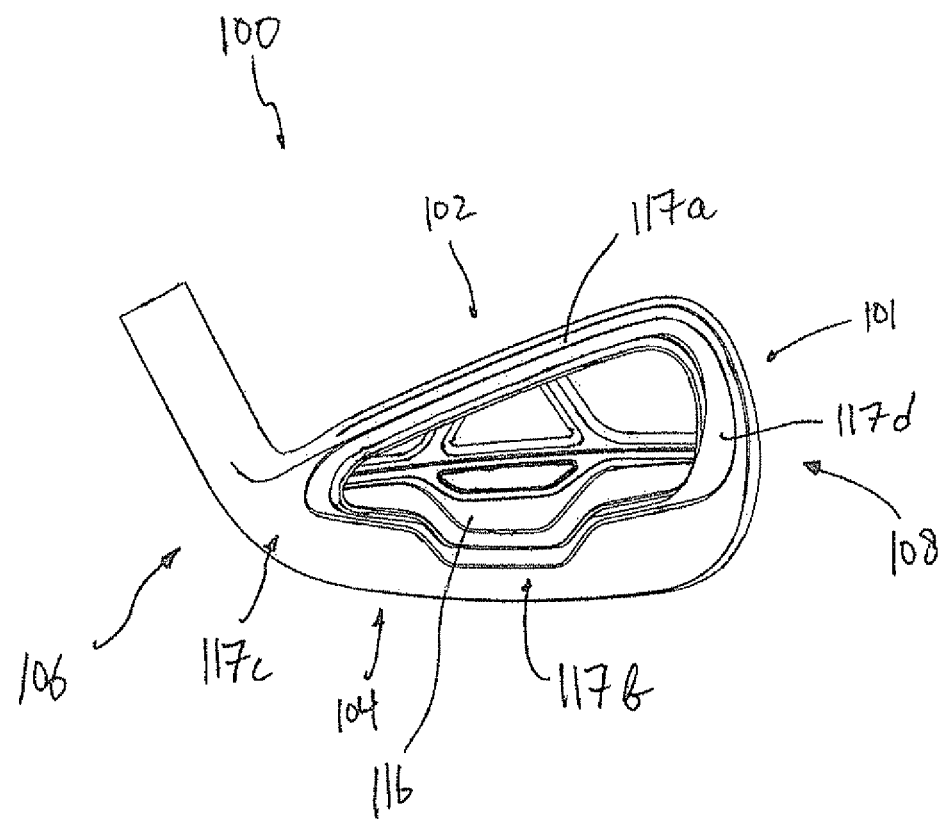
FIG. 1b is a rear elevation view of a the golf club head of FIG. 1a, according to one example embodiment.

FIG. 1b illustrates a rear elevation view of the golf club head 100. As discussed above, the golf club head 100 further includes the rear insert 116 that fills at least a portion of the rear cavity 103 and is attached to one or more of the main body 101 and the striking face insert 114, discussed above. The rear insert 116 may serve any number of purposes. For example, in some embodiments, the rear insert 116 may be a vibration absorption plaque that is specifically designed to dampen any extraneous vibration that a user may feel on off-center shots, for example, or to enhance the feel of the golf club head 100 during a golf shot. In such embodiments, the rear insert 116 may comprise one or more materials having a hardness and/or a specific gravity less than a material of the main body 101. In some embodiments, the rear insert 116 may alternatively, or additionally, be secured to the main body 101 to enhance the acoustics of the golf club an impact occurs with a golf ball. The rear insert 116 may also provide a means to adjust or customize the swingweight of the club head 100.

The rear insert 116, accordingly, may comprise any of a rubber, an elastomer, a polymer, a metal, a visco-elastic material, or any combination thereof such as, but not limited to, an aluminum captive arrangement having a rubber backing, or a rubber having aluminum tracing, for example.

Referring to FIGS. 1b through 1e, according to various embodiments, the main body 101 has a perimeter-weighting element 117 that has a top portion 117a, a sole portion 117b, a heel portion 117c, and a toe portion 117d. As shown, the various portions of the perimeter weighting element 117 at least partially form the rear cavity 103. In some embodiments, an auxiliary recess 105 extends outward from, and intersects with, the rear cavity 103.

Figure 1C:
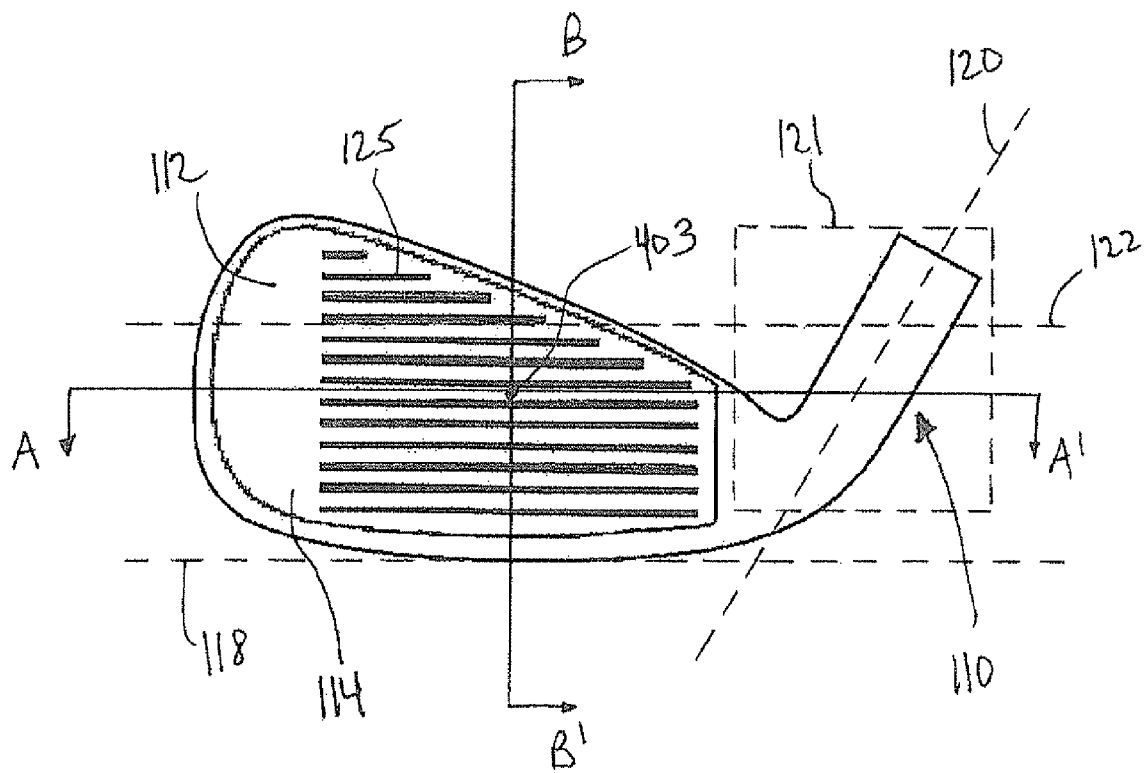
FIG. 1c is a front elevation view of the golf club head of FIG. 1a, according to one example embodiment.
Figure 1E:
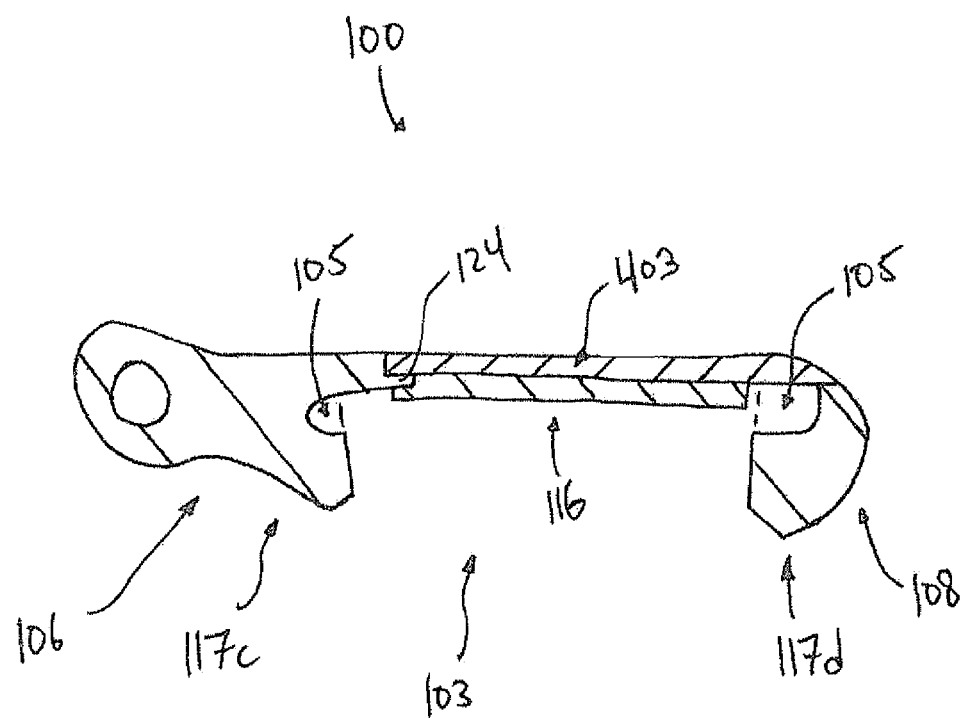
FIG. 1e is a cross-sectional view of the golf club head of FIG. 1a through plane A-A', according to one example embodiment.
Figure 1F:
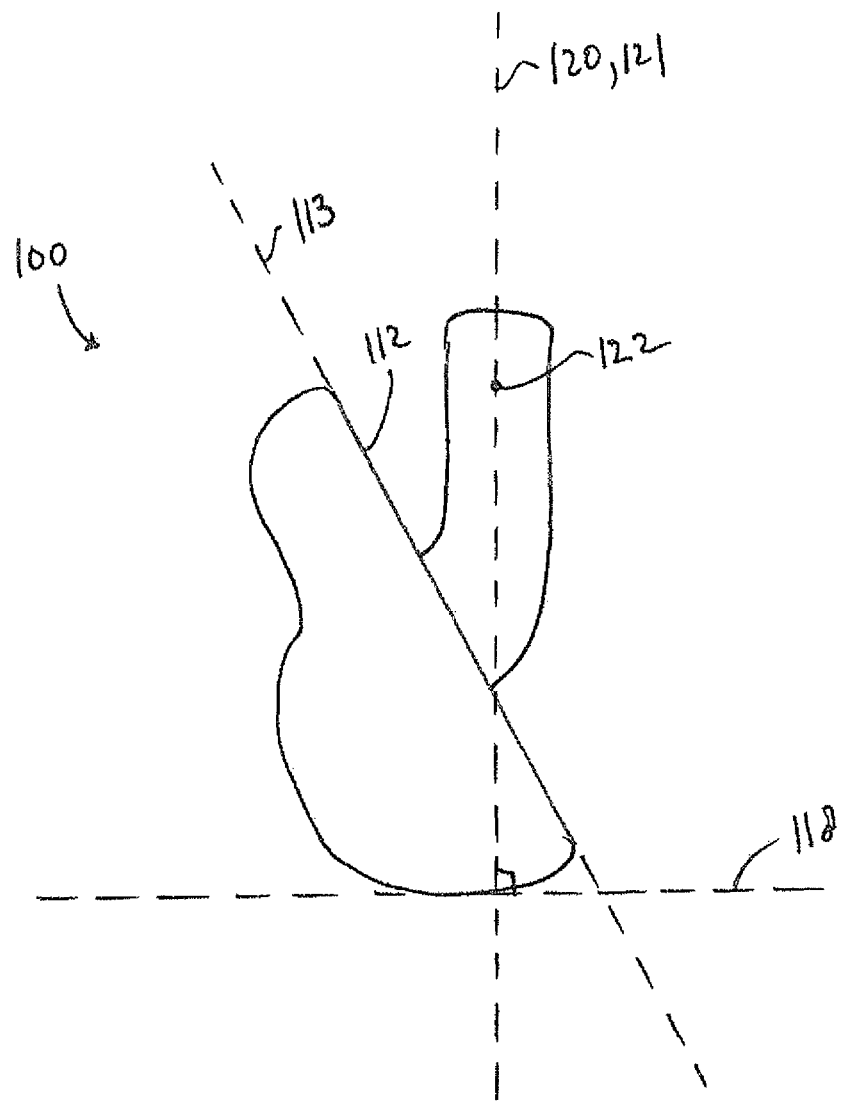
FIG. 1f is a toe-side elevation view of the golf club head of FIG. 1a, according to one example embodiment.

FIGS. 1c and 1f illustrate the club head 100 in a reference position. As shown in FIG. 1f, an imaginary striking face plane 113 is generally coplanar with the striking face 112. Also, a hosel axis 120 lies in an imaginary hosel plane 121. As used here, the term "reference position" denotes a position of the club head 100 where the imaginary hosel plane 121 is vertical relative to the ground plane 118, and the hosel plane 121 contains an imaginary horizontal line 122 that is parallel to the imaginary striking face plane 113. Unless otherwise indicated, all parameters herein are specified with the golf club head 100 in the reference position.

Referring again to FIG. 1e, a first cross-section A-A' extends parallel to the ground plane 118 and passes through a portion of the rear insert 116. A second cross-section B-B' is vertical relative to the ground plane 118 and passes through a portion of the rear insert 116 (see FIG. 1a). In this embodiment, both the first cross-section A-A' and the second cross-section B-B' pass through the face center 403.

As used herein, the face center denotes the geometry center of the generally planar portion of the front portion of the club head, where the club head is absent scorelines. For club heads having scorelines located on the front portion, e.g. the scorelines 125, the face center, e.g. the face center 403 denotes the point that lies halfway between the heelmost extent and toemost extent of the scorelines, and halfway between the uppermost extent and the lowermost extent of the scorelines, which in some cases may differ from the geometry center of the generally planar portion of the front portion of the club head.

As shown in FIG. 1d, the auxiliary recess 105 extends from, and intersects with, the rear cavity 103 toward a bottom surface 104a of the sole portion 104. Also, the auxiliary recess 105 extends from, and intersects with, the rear cavity 103 toward the upper surface 102a of the top portion 102. Further, as shown in FIG. 1e, the auxiliary recess 105 extends from, and intersects with, the rear cavity 103 proximate the heel portion 106 and proximate the toe portion 108. In some embodiments, a single continuous auxiliary recess 105 extends about the periphery of the rear cavity 103. However, in other embodiments, plural, discrete auxiliary recesses are formed that extend outward from various portions of the rear cavity 103. In some embodiments, the auxiliary recess 105 extends outward from the rear cavity 103 only proximate the heel portion 106. In other embodiments, the auxiliary recess 105 extends outward from the rear cavity 103 proximate the heel portion 106 and at least one of the top portion 102 and the sole portion 104, but not proximate the toe portion 108.

With specific reference to FIG. 1d, in one or more embodiments, the top portion 102 of the golf club head 100 includes at least a first chamfer 107a and a second chamfer 107b, adjacent to the first chamfer 107a. By providing plural chamfers, by virtue of the reflection of light on the surface of the club head 100, the top portion 102 appears thinner than it actually is, when viewed generally from the rear. Such a feature allows for a more supportive, and often more forgiving, golf club head 100. Having plural chamfers also provides for a more aesthetically appealing club head thereby instilling confidence in the player, as well as attracting players that normally use golf club heads that have thin top lines. In other embodiments, either, or both, of the first chamfer 107a and second chamfer 107b are excluded from the top portion 102.

Referring to FIGS. 1d and 1e, the striking face 112 lies in the striking face plane 113. The main body 101 also has a front recess in which the striking face insert 114 is located and secured to the main body 101. The striking face insert 114 has a front surface that is flush with the front surface of the main body 101 and, thus, lies in the striking face plane 113 when installed. In some embodiments, the striking face insert 114 is secured to the main body 101 by welding. In other embodiments, the striking face insert 114 may be secured by a combination of a press-fit process with an adhesive, for example. The striking face insert 114 may be comprised of any metal, polymer, ceramic, fiber-reinforced polymer, or any combination thereof. For example, the striking face insert 114 may be comprised of stainless steel such as 431 stainless steel, 17-4 stainless steel, titanium, or a titanium alloy such as 6-4 titanium. Like the main body 101, striking face insert 114 may be formed by any of a casting, milling, cutting, or forging process, or any combination thereof, for example.

Referring to FIG. 1e, the auxiliary recess 105 intersects with, and extends outward from, the rear cavity 103 proximate the heel portion 106 of the main body 101. Also, proximate the toe portion 108, the auxiliary recess 105 extends from, and intersects with the rear cavity 103, toward the toe portion 108. In this embodiment, and in this specific cross-section, the rear insert 116 is located entirely within the rear cavity 103. However, in alternative embodiments, the rear insert 116 extends at least partially into the auxiliary recess 105 of the main, or rear, cavity 103 proximate the heel portion 106. In other embodiments, the rear insert 116 extends entirely into the auxiliary recess 105 of the main, or rear, cavity 103 in the heel portion 106. Also, the location of the rear insert 116 relative to the location of the rear cavity 103 and the auxiliary recess 105 may vary from cross-section to cross-section (e.g. from a first horizontal cross-section to a second horizontal cross-section vertically spaced from the first horizontal cross-section). For example, in some embodiments, in addition to the having the club head configuration of cross-section A-A' (passing through the face center), the club head is configured such that, in a second cross-section that is parallel to, and vertically spaced from, the cross-section A-A' by 5 mm and passes through a portion of the rear insert, the rear insert extends into the auxiliary recess 105.

Figure 2:
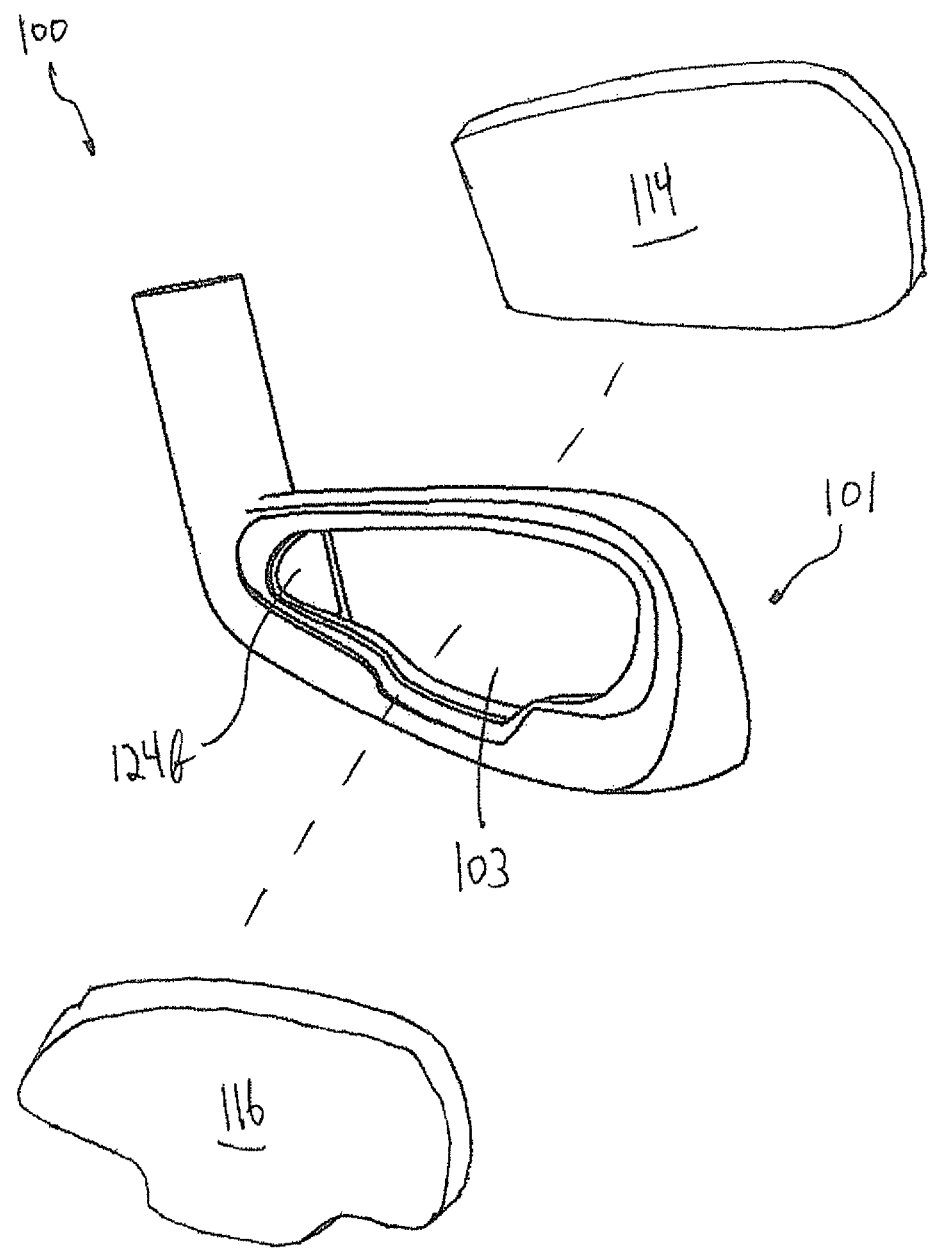
FIG. 2 is an exploded perspective view of the golf club head of FIG. 1a, according to one example embodiment.
Figure 2A:
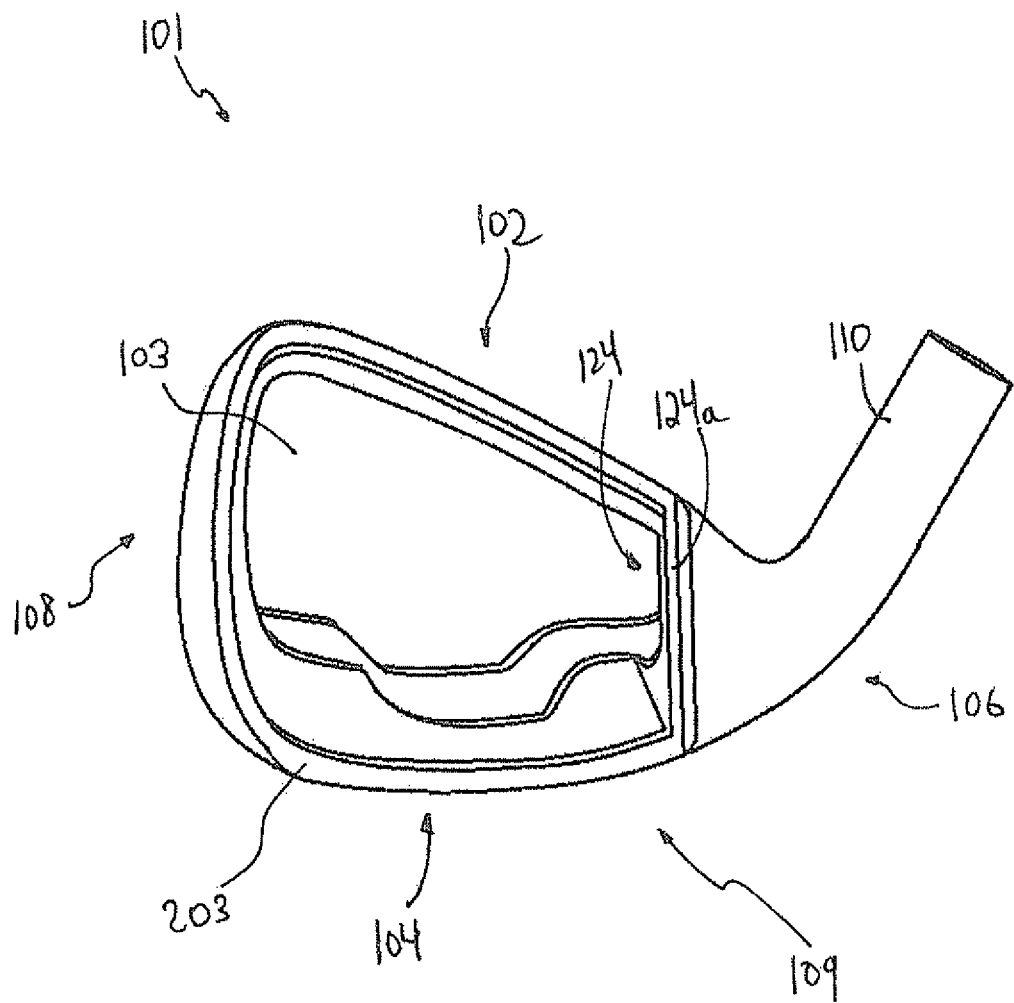
FIG. 2a is a perspective view of a main body of the golf club head of FIG. 2, according to one example embodiment.

Referring to FIG. 2, various components of the club head 100 are shown in an exploded view. Specifically, the main body 101 is shown as between the striking face insert 114 and the rear insert 116. As shown in FIG. 2a, the main body 101 is shown in further detail as viewed generally from the front. The front portion 109 of the main body 101 of the club head 100 includes a recessed, or stepped, attachment surface 203. The attachment surface 203 is generally planar and provides a region onto which the striking face insert may be welded. The attachment surface forms a flange 124 proximate the heel portion 106. The flange 124 has a front surface 124a corresponding to a portion of the contact surface 203 and a rear surface 124b (see FIG. 2). The flange 124 terminates proximate the top portion 102 and proximate the sole portion 104. In alternative embodiments, the flange 124 is located in any of the top portion 102, sole portion 104, and toe portion 108. In some embodiments, the flange 124 is a continuous extent encircling the region in which the striking face insert 114 is to be located. In some embodiments, plural discrete flanges extend about the periphery of the region in which the striking face insert 114 is to be located. Such discrete flanges may be spaced apart, such that additional mass may be repositioned to further improve the mass characteristics of the club head.

Figure 3:
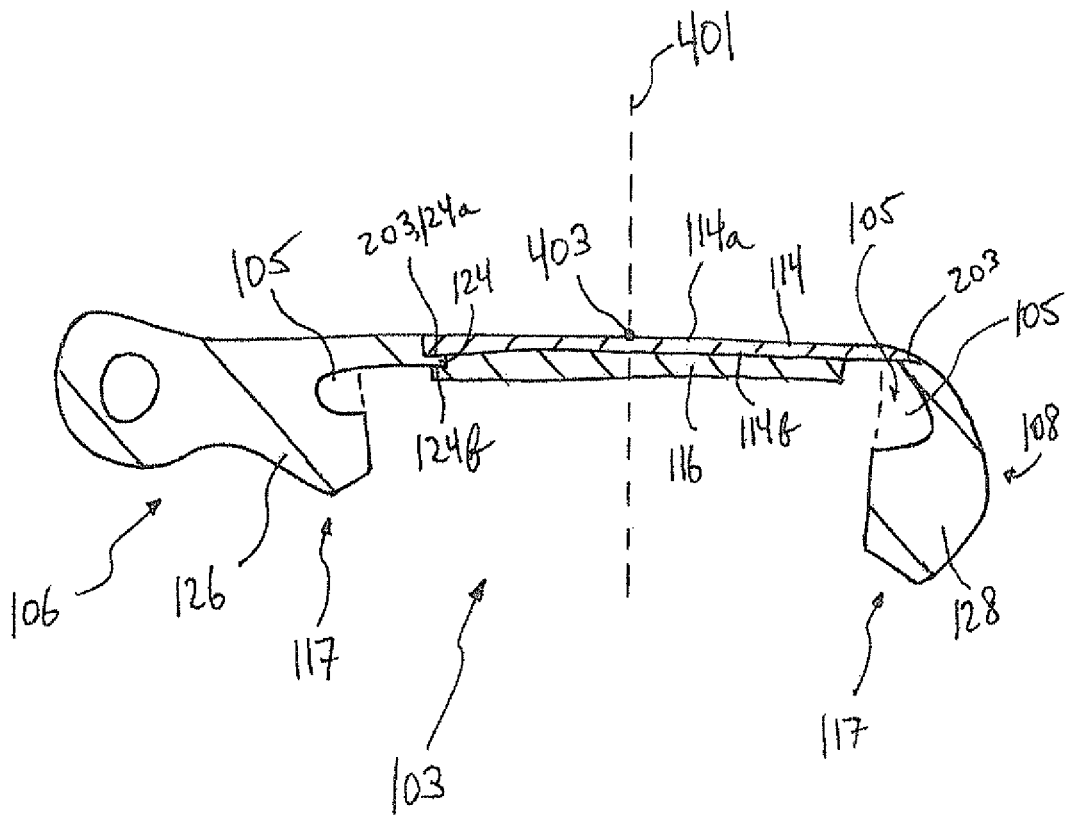
FIG. 3 is a cross sectional view of the golf club head of FIG. 1a through cross section A-A', according to one example embodiment.

Referring to FIGS. 3 and 3a, the club head 100 is shown in cross-section A-A'. The cross-section A-A' passes through a portion of the rear insert 116 and the face center 403 of the striking face 112. The striking face insert 114 include a front surface 114a and a rear surface 114b opposite the front surface 114a. As shown, the striking face insert 114 is secured to the contact surface 203 of the main body 101, and the rear insert 116 is secured to one or more of a rear surface 114b of the striking face insert 114 and the rear surface 124b of the flange 124. In alternative embodiments, the rear insert 116 is secured to only one of the striking face insert 114 and the flange 124. However, limiting the extent of the rear insert 116 to the generally planar region defined by the rear surface 114b of the striking face insert 114 limits the effect of the rear insert 116, e.g. its vibration damping capability. The rear surface 124b, while illustrated as being primarily flat, may be stepped, or have some other geometry, for example, which the rear insert 116 may be configured to complement. In some embodiments, the rear surface 203b extends into the auxiliary recess 105 of the rear cavity 103, or it may simply be present only in the rear cavity 103.

As illustrated in FIGS. 3 and 3a, the golf club head 100 has an imaginary vertical center plane 401 that passes through the face center 403 of the striking face 112 when the golf club head 100 is in the reference position, as defined above. In some embodiments, a minimum distance A between the vertical center plane 401 and the centermost edge 301 of the flange 124 is in a range of 0.05 inches to about 1.5 inches, more preferably between 0.75 inches and 1.25 inches, ant most preferably substantially equal to about 1.0 inches. A difference between a minimum distance B between the vertical center plane 401 and a heelmost extent of the attachment surface 203 and the distance A is in a range of between about 0.05 inches to about 0.25 inches, more preferably between about 0.08 inches and about 0.15 inches.

In some embodiments, the difference between the distance B and the distance A, measured in like cross-sections, is equal for at least two club heads of a correlated set of golf club heads 100, for example, in set of irons including a #3-iron through a sand wedge. In some embodiments, the difference between the distance A and the distance B is equal for at least three club heads of a correlated set, and, optionally, equal for each club head throughout a correlated set. In alternative embodiments, however, the difference between the distance B and the distance A varies throughout a correlated set of golf club heads 100 either uniformly, e.g. as a linear or curvilinear function of club head loft angle, or randomly.

As discussed above, the rear insert 116 is configured to be secured to the rear surface 114b of the striking face insert 114 and/or the rear surface 124b of the flange 124. The heelwardmost extent 116a of the rear insert 116, when installed, is a minimum distance C from the vertical center plane 401. The distance C is preferably less than the distance B. This is due to efforts to maximize the advantageous material properties of the striking face insert 114 over the largest viable area, while limiting the extent of the rear insert 116 to areas most likely to experience unfavorable dynamic excitation, thereby maximizing discretionary weight. However, in other embodiments, the distance C is greater than the distance B.

Referring to FIGS. 3 and 3a, in the cross-section A-A', the perimeter-weighting element 117 forms a heel extent 126 proximate the heel portion 106 and a toe extent 128 proximate the toe portion 108. The heel extent 126 includes a centermost point 130 (see FIG. 3a) being the point on the heel extent 126 closest to the center plane 401. The heel extent 126 is laterally spaced a minimum distance D from the center plane 401. The auxiliary recess 105, proximate the heel portion 106, includes a heelwardmost point 132. The heelwardmost point 132 is spaced a minimum lateral distance E from the center plane 401. The distance D is preferably less than the distance E. Additionally, it should be noted that the distance C is preferably less than or equal to the distance E, and the distance C is greater than the distance A. In some embodiments, the distance C is greater than the distance A, but less than the distance B. Such configurations reduce complexity in manufacturing by not requiring the fitting of the rear insert 116 into the auxiliary recess 105 and enable better visibility in the positioning of the rear insert 116. However, in alternative embodiments, the rear insert 116 is configured to extend, at least partially, into the auxiliary recess 105, resulting in the distance C being greater than the distance D. This configuration may be favorable for providing a seamless appearance of the rear insert 116, striking face insert 114, and main body 101 combination.

The rear surface 124b of the flange 124 also has a maximum height when the golf club head 100 is in the reference position from a lowermost extent to an uppermost most extent. The maximum height is measured vertically, in a plane parallel to the hosel plane 121. In some embodiments, the maximum height may be uniform or variable throughout a correlated set of golf club heads 100. For example, the maximum height of the rear surface 124b may be in a range of about 0.25 to about 0.75 inches. In other embodiments, the maximum height of the rear surface 124b may be in a range of about 0.45 to about 0.65 inches.

According to various embodiments, the flange 124 has a thickness between the front surface, i.e. the attachment surface 203, and the rear surface 124b. In some embodiments, the thickness may be uniform or variable throughout a correlated set of golf club heads. For example, the thickness may range between about 0.02 inches and about 0.08 inches. The thickness, in some embodiments, varies for at least two, and optionally three, golf club heads of a correlated set. In some such embodiments, the thickness varies linearly, or curvilinearly, with loft angle. However, in alternative embodiments, the thickness may be uniform throughout the set. For example, the thickness may be set to be uniform throughout the correlated set of golf club heads at about 0.059 inches.

Figure 4:
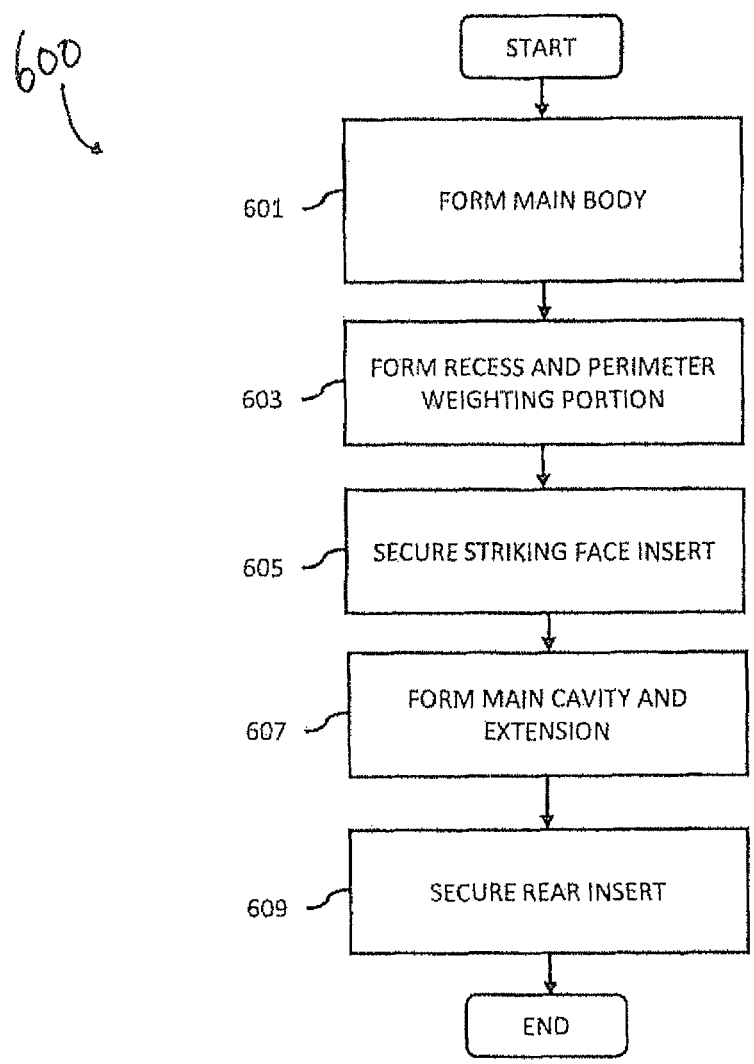
FIG. 4 is a flowchart illustrating a process for manufacturing a golf club head according to one example embodiment.

FIG. 4 is a flowchart illustrating a process 600 for manufacturing a golf club head, e.g. the golf club head 100 as discussed above. According to various embodiments, the process may be performed by an operator or a chip set including a processor and a memory configured to execute computer readable code that is related to manufacturing a golf club head. In step 601, a main body 101 is formed by causing the main body 101 to have a front portion 109, a rear portion 111, a top portion 102, a sole portion 104, a heel portion 106, a toe portion 108, and a front recess 201 extending from the front portion 109 toward the rear portion 111. The main body 101 may also optionally be caused to have plural chamfers located on the top portion 102. Then, in step 603, the recess 201 is caused to include a recessed, planar attachment surface 203 that forms a portion of a flange 124 at least proximate the heel portion 106 of the main body 101 and the rear portion 111 is caused to include a perimeter-weighting element 117 having a top portion, a sole portion, a heel portion and a toe portion.

Next, in step 605, a striking face insert 114 is caused to be secured, for example, by a welding process, within the recess 201 and flush with the front portion 109 of the main body 101, thereby forming a generally planar striking face 112. The striking face insert 114 is caused to have a front surface 114a and a rear surface 114b. The striking face 112 defines a face center 403. The striking face insert 114 is generally coplanar with an imaginary striking face plane 113.

The process continues to step 607 in which a main, or rear, cavity 103 is caused to be formed that is at least partially delimited by the perimeter-weighting element 117 and the rear surface 114b of the striking face insert 114. Then, in step 609, a rear insert 116 is caused to be secured to the rear surface 407 of the striking face insert 114. In some embodiments, the rear insert 116 is caused to have one or more stepped portions configured to mate with the main body 101 and the rear surface 407 of the striking face insert 114.

When the golf club head 101 is in a reference position, an imaginary vertical center plane 401 passes through the face center 403 of the striking face insert 114. In an imaginary horizontal plane (e.g. cross-section A-A') that passes through a portion of the rear insert 116, and optionally passes through the face center 403, the rear insert 116 comprises a heelwardmost point 116a and a toewardmost point 116b opposite the heelwardmost point 116a, the heelwardmost point 116a of the rear insert 116 is spaced by a distance C from the vertical center plane 401 which is further than a minimum distance B between the flange 124 and the vertical center plane 401. Additionally, proximate the heel extent 126 of the perimeter-weighting element 117, the rear cavity 103 extends heelward in the forward direction as illustrated by auxiliary recess 105 of the main, or rear, cavity 103. In some embodiments, this occurs by having a forwardly divergent rear cavity 103. Alternatively, or in addition, an auxiliary recess 105 intersects with, and extends outward from, the rear cavity 103.

Those skilled in the art will appreciate that while the present invention has been described in association with presently preferred aspects thereof, numerous changes, modifications and substitutions of equivalents may be made therein without departing from the spirit and scope of this invention which is intended to be unlimited by the foregoing except as may appear in the following appended claims. Further, although features of the invention are expressed in certain combinations among the claims, it is contemplated that these features can be arranged in any combination and order.

What is claimed is:

1. A golf club head that, when oriented in a reference position, comprises:
   a main body having a front portion, a rear portion, a top portion, a sole portion, a heel portion, a toe portion, and a front recess extending from the front portion toward the rear portion, the front recess including a flange, the rear portion including a perimeter-weighting element;
   a striking face insert secured within the front recess and having a front surface and a rear surface, the striking face insert being generally coplanar with an imaginary striking face plane;
   a face center located on the front surface of the striking face insert;
   a rear cavity at least partially delimited by the perimeter-weighting element and the rear surface of the striking face insert;
   a rear insert secured to the rear surface of the striking face insert; and
   an imaginary vertical center plane perpendicular to the striking face plane and passing through the face center, wherein, in an imaginary horizontal plane passing through a portion of the rear insert:
the rear insert comprises a heelwardmost point and a toewardmost point opposite the heelwardmost point; and
proximate the heel portion, the heelwardmost point of the rear insert is spaced further from the center plane than a minimum distance between the flange and the center plane, and the club head comprises an auxiliary recess that intersects with the rear cavity and extends outward from the rear cavity toward at least one of the top portion, the sole portion, the heel portion, and the toe portion.

2. The golf club head of claim 1, wherein the striking face insert is secured within the recess by a welding process.

3. The golf club head of claim 2, wherein the striking face insert comprises at least one of stainless steel, titanium, aluminum, copper, metal alloy, polymer, and a fiber reinforced polymer.

4. The golf club head of claim 1, wherein:
the rear insert further comprises a rear insert front surface proximate the striking face insert and a rear insert rear surface distal the striking face insert;
a first step is formed by the junction of the rear surface of the striking face insert and the flange proximate the heel portion; and
a second step is located on the rear insert front surface that is complementary to the first step.

5. The golf club head of claim 1, wherein the rear insert comprises a material having a hardness less than a hardness of the main body.

6. The golf club head of claim 5, wherein the rear insert comprises at least one of a viscoelastic material, a metal, a polymer, and a fiber reinforced polymer.

7. The golf club head of claim 1, wherein the top portion of the main body comprises a plurality of chamfers.

8. The golf club head of claim 1, wherein, proximate the heel portion, the minimum distance between the flange and the center plane is between about 0.2 inch and about 1.75 inches.

9. The golf club head of claim 1, wherein, in the imaginary horizontal plane: a heel extent of the perimeter-weighting element is spaced from the center plane by a minimum distance $d_1$; and
the heelwardmost point of the rear insert is spaced from the center plane by a minimum distance $d_2$ that is greater than $d_1$.

10. The golf club head of claim 1, wherein the flange has a thickness that is between about 0.02 inch and about 0.08 inch.

11. The golf club head of claim 1, wherein the imaginary horizontal plane passes through the face center.

12. The golf club head of claim 1, wherein the imaginary horizontal plane passes through the face center.

13. A method of manufacturing a golf club head comprising:
providing a main body having a front portion, a rear portion, a top portion, a sole portion, a heel portion, a toe portion, and a front recess extending from the front portion toward the rear portion;
providing the front recess with a flange and the rear portion with a perimeter-weighting element having a top portion, a sole portion, a heel portion, and a toe portion;
securing a striking face insert within the front recess and flush with the front portion of the main body, the striking face insert having a front surface, a rear surface and being generally coplanar with an imaginary striking face plane;
securing a rear insert to the rear surface of the striking face insert,
wherein:
a face center is located on the front surface of the striking face insert;
a rear cavity to be formed that is at least partially delimited by the perimeter-weighting element and the rear surface of the striking face insert; and
when the golf club head is in a reference position, an imaginary vertical center plane that is located perpendicular to the striking face plane passes through the face center of the striking face insert, and in an imaginary horizontal plane that passes through a portion of the rear insert:
the rear insert comprises a heelwardmost point and a toewardmost point opposite the heelwardmost point; and
proximate the heel portion, the heelwardmost point of the rear insert is spaced further from the center plane than a minimum distance between the flange and the center plane, and the club head comprises an auxiliary recess that intersects with the rear cavity and extends outward from the rear cavity toward at least one of the top portion, the sole portion, the heel portion, and the toe portion.

14. The method of claim 13, further comprising causing, at least in part, the striking face insert to be secured within the recess by a welding process.

15. The method of claim 14, wherein the striking face insert comprises at least one of stainless steel, titanium, aluminum, copper, metal alloy, polymer, and a fiber reinforced polymer.

16. The method of claim 13, wherein:
the rear insert to include a rear insert front surface proximate the striking face insert and a rear insert rear surface distal the striking face insert; and
the method further comprises:
forming a first step at the junction of the striking face insert and the flange proximate the heel portion; and
forming a second step on the rear insert front surface that is complementary to the first step.

17. The method of claim 13, wherein the rear insert comprises a material having a hardness less than a hardness of the main body.

18. The method of claim 17, wherein the rear insert comprises at least one of a viscoelastic material, a metal, a polymer, and a fiber reinforced polymer.

19. The method of claim 13, wherein the top portion of the main body includes a plurality of chamfers.

20. The method of claim 13, wherein, proximate the heel portion, the minimum distance between the flange and the center plane is between about 0.2 inch to about 1.75 inches.

21. The method of claim 13, wherein, in the imaginary horizontal plane:
a heel extent of the perimeter-weighting element is spaced from the center plane by a minimum distance $d_1$; and
the heelwardmost point of the rear insert is spaced from the center plane by a minimum distance $d_2$ that is greater than $d_1$.

22. The method of claim 13, wherein the flange has a thickness that is between about 0.02 inch and about 0.08 inch.

* * * * *